United States Patent
Huang et al.

(10) Patent No.: US 12,524,203 B2
(45) Date of Patent: Jan. 13, 2026

(54) ADDING CIRCUIT FOR MULTI-CHANNEL SIGNALS AND IMPLEMENTATION METHOD OF ADDING CIRCUIT FOR MULTI-CHANNEL SIGNALS

(71) Applicant: Fremont Micro Devices Corporation, Guangdong (CN)

(72) Inventors: Chong Huang, Guangdong (CN); Yuquan Huang, Guangdong (CN); Kelvin Yupak Hui, Guangdong (CN)

(73) Assignee: Fremont Micro Devices Corporation, Shenzhen (CN)

( * ) Notice: Subject to any disclaimer, the term of this patent is extended or adjusted under 35 U.S.C. 154(b) by 996 days.

(21) Appl. No.: 17/680,275

(22) Filed: Feb. 24, 2022

(65) Prior Publication Data

US 2023/0058715 A1    Feb. 23, 2023

(30) Foreign Application Priority Data

Aug. 19, 2021   (CN) .......................... 202110953589.7

(51) Int. Cl.
  G06F 7/50 (2006.01)
  H03F 3/00 (2006.01)
  (Continued)

(52) U.S. Cl.
  CPC .............. G06F 7/50 (2013.01); H03F 3/005 (2013.01); H03F 3/45475 (2013.01); H03K 3/017 (2013.01)

(58) Field of Classification Search
  CPC .......... G06F 7/50; G06F 3/0446; G06F 3/044;
    G06F 3/04166; G06F 3/0412; G06F 3/0418; G06F 2203/04104; G06F 3/04182; G06F 3/04164; G06F 3/0416; G06F 3/046; G06F 1/1692; G06F 3/0448; G06F 2203/04103; G06F 2203/04111; G06F 3/0443; G06F 2203/04106; G06F 1/3262; G06F 2203/04101; G06F 2203/04112;
  (Continued)

(56) References Cited

U.S. PATENT DOCUMENTS 7,315,200 B2 *   1/2008   Holberg ................ H03M 3/484
                                       327/344
7,477,079 B2 *   1/2009   Gaboriau ................ H03M 1/08
                                       341/122
(Continued)

*Primary Examiner* — John W Poos

(57) ABSTRACT

An adding circuit for multi-channel signals and an implementation method thereof are disclosed. The adding circuit for multi-channel signals includes an operational amplifier, a plurality of charge and discharge circuits, a charge transfer circuit, a switch sequence and a control circuit. In this disclosure, the duty cycle of each charge and discharge circuit and the charge transfer circuit can be programmed and preset according to the actual needs, which is not only suitable for the static voltage adding circuit, but also suitable for the dynamic voltage adding circuit. When there are multi-channel signals, the output interference caused by individual signals can be prevented. The area of the adding circuit can be greatly reduced. The adding circuit can be IP-based, controlled by programing and presetting a variety of combined adding algorithms, so the chip cost can be saved and a wide applicability in detection and monitoring can be provided.

17 Claims, 5 Drawing Sheets

(51) Int. Cl.
    *H03F 3/45*         (2006.01)
    *H03K 3/017*     (2006.01)

(58) Field of Classification Search
    CPC .. G06F 3/041; G06F 3/041661; G06F 3/0444; G06F 11/1048; G06F 11/1068; H03F 3/005; H03F 3/45475; H03F 2200/264; H03F 1/0227; H03F 2203/45536; H03F 2203/45116; H03F 2200/471; H03F 2200/321; H03F 2200/129; H03F 2200/126; H03F 1/08; H03F 2200/372; H03F 3/45071; H03F 2203/45512; H03F 1/34; H03F 3/2173; H03F 1/083; H03F 1/0277; H03F 3/70; H03F 2200/03; H03F 3/2178; H03F 3/2171; H03F 1/303; H03F 3/181; H03F 3/217; H03K 3/017; H03K 5/1515; H03K 17/9622; H03K 2217/960725; H03K 17/955; H03K 17/962; H03K 2017/9613; H03K 2017/9602; H03K 2217/96073; H03K 2217/0081; H03K 2217/960745; H03K 2217/960705; H03K 17/965; H03K 17/687; H03K 2217/960775; H03K 2217/9607; H03K 2217/96058

See application file for complete search history.

(56) References Cited

U.S. PATENT DOCUMENTS

| | | | |
|---|---|---|---|
| 7,724,041 B2 * | 5/2010 | Draxelmayr | G11C 27/026 327/91 |
| 2004/0217815 A1 * | 11/2004 | Shirai | H03G 1/0094 330/282 |
| 2016/0079941 A1 * | 3/2016 | Zhong | H03F 3/45475 330/9 |

\* cited by examiner

ADDING CIRCUIT FOR MULTI-CHANNEL SIGNALS AND IMPLEMENTATION METHOD OF ADDING CIRCUIT FOR MULTI-CHANNEL SIGNALS

CROSS-REFERENCE TO RELATED APPLICATIONS

This application claims a priority of a Chinese application No. 202110953589.7, filed on Aug. 19, 2021, the content of which is incorporated herein by reference in its entirety.

TECHNICAL FIELD

The disclosure relates to the technical field of adding circuit for multi-channel signals, and more particularly to an adding circuit for multi-channel signals and an implementation method of the adding circuit for multi-channel signals.

BACKGROUND

FIG. 1 has shown a known adding circuit for voltage signals, which includes operational amplifiers opa, two current mirror circuits composed of resistors R0, R1, R2, MOSFETs M1, M2, M3 and M4, and filter capacitor C0. Its working principle is as follows. When the reference voltages V1 and V2 are input, the reference voltage V1 is negatively fed back through the operational amplifier opa, which enables the voltage on the resistor R1 to be V1, and the current flowing through the resistor R1 to be I_R1=V1/R1. When the current I_R1 flows through the MOSFET M1, the mirror current generated on the MOSFET M2 through the current mirror circuit is I_M2=K1*I_R1. Then the current I_M2 flows to the resistor R0. Similarly, the reference voltage V2 is negatively fed back through the operational amplifier opa, which enables the voltage on the resistor R2 to be V2, and the current flowing through the resistor R2 to be I_R2=V2/R2. When the current I_R2 flows through the MOSFET M3, the mirror current generated on the MOSFET M4 through the current mirror circuit is I_M4=K2*I_R2. Then the current I_M4 flows to the resistor R0. Therefore, the currents flowing through the MOSFETs M2 and M4 are summed on the resistor R0. The summed current flowing through the resistor R0 is I_R0=I_M2+I_M4=K1*I_R1+K2*I_R2=K1*(V2/R2)+K2*(V2/R2), and the voltage on the resistor R0 is Vo=R0*(K1*(V2/R2)+K2*(V2/R2))=(K1*V2*(R0/R2)+K2*V2*(R0/R2)). This method is suitable for a static voltage adding circuit. When there are multi-channel signals, the operational amplifier opa and the current mirror occupy a large area and the dynamic signal adding is easy to be interfered.

SUMMARY

In this regard, an adding circuit for multi-channel signals and an implementation method of the adding circuit for multi-channel signals are provided in this disclosure, aiming at the above defects.

In a first aspect, an adding circuit for multi-channel signals is provided, which including:
- an operational amplifier, which is provided with a first input terminal and a second input terminal having an equal voltage in a steady state, wherein the first input terminal is connected to a reference ground;
- a plurality of charge and discharge circuits, which are connected between the reference ground and the second input terminal of the operational amplifier, wherein the charge and discharge circuit is operable to be charged via a connected reference voltage and then discharge electrical charges in each clock cycle when the charge and discharge circuit itself is in a working state;
- a charge transfer circuit, which is connected between an output terminal and the second input terminal of the operational amplifier and operable to discharge electrical charges and then be charged via the electrical charges discharged by all the charge and discharge circuits which are currently in the working state in each clock cycle when the charge transfer circuit itself is in a working state;
- a switch sequence, which includes a plurality of switches distributed in the plurality of charge and discharge circuits and the charge transfer circuit, and is operable to control a state of each of the plurality of charge and discharge circuits and a state of the charge transfer circuit to be or not to be the working state in each clock cycle by changing a switch state of the switch sequence;
- a control circuit, which is operable to calculate a number of the clock cycle in which the plurality of charge and discharge circuits and the charge transfer circuit are respectively in the working state during one integration cycle, based on the integration cycle and a duty cycle respectively preset for the plurality of charge and discharge circuits and the charge transfer circuit; to control an actual number of the clock cycle in which the plurality of charge and discharge circuits and the charge transfer circuit are respectively in the working state during one integration cycle to be equal to the calculated number via controlling a state of each switch in the switch sequence; and to determine an adding result according to a voltage at the output terminal of the operational amplifier in at least one integration cycle, wherein, the integration cycle is composed of a plurality of the clock cycles.

Preferably, each of the charge and discharge circuit and the charge transfer circuit includes at least one charge and discharge capacitor respectively.

Preferably, the adding result determined according to a voltage at the output terminal of the operational amplifier in at least one integration cycle, is calculated as follows:

$$\Sigma_{i=1}^{n} Di*Vi*Ci = D0*C0*Vout;$$

wherein, n represents a number of the charge and discharge circuits, Di represents a duty cycle corresponding to an ith charge and discharge circuit, $0 \leq Di \leq 1$, Vi represents a voltage value of the connected reference voltage of the ith charge and discharge circuit, Ci represents a capacitance of the charge and discharge capacitor of the ith charge and discharge circuit, D0 represents a duty cycle corresponding to the charge transfer circuit, C0 represents a capacitance of the charge and discharge capacitor of the charge transfer circuit, Vout represents an average value of the voltage at the output terminal of the operational amplifier in at least one integration cycle.

Preferably, in each clock cycle, a switching time for charge and discharge of the charge and discharge circuit in the working state, and a switching time for charge and discharge of the charge transfer circuit in the working state, are all kept synchronized.

Preferably, the switch sequence includes a plurality of first switches and a plurality of second switches, and both terminals of each of the charge and discharge circuit and the charge transfer circuit are connected with two first switches and two second switches;

wherein the charge and discharge circuit is charged by switching on corresponding first switch and switching off corresponding second switch, and discharged by switching on the corresponding second switch and switching off the corresponding first switch;

the charge transfer circuit is discharged by switching on corresponding first switch and switching off corresponding second switch, and charged by switching on the corresponding second switch and switching off the corresponding first switch;

when the charge and discharge circuit and the charge transfer circuit are not in the working state, the corresponding first switch and the corresponding second switch are both switched off.

Preferably, a first terminal of each charge and discharge circuit is connected to a corresponding reference voltage via one first switch and is further connected to the reference ground via one second switch, wherein a second terminal of each charge and discharge circuit is connected to the reference ground via one first switch and is further connected to the second input terminal of the operational amplifier via one second switch.

Preferably, a first terminal of the charge transfer circuit is connected to the reference ground via one first switch and is further connected to the second input terminal of the operational amplifier via one second switch, wherein a second terminal of the charge transfer circuit is connected to the reference ground via one first switch and is further connected to the output terminal of the operational amplifier via one second switch.

Preferably, both the first switch and the second switch are switched on by a high level, and switched off by a low level, wherein a control signal of the first switch is obtained by combining a clock signal and a duty cycle signal corresponding to a preset duty cycle, and a control signal of the second switch is obtained by combining an inverse signal of the clock signal and the duty cycle signal;

wherein, the duty cycle signal has a signal cycle which is consistent with the integration cycle, wherein in one signal cycle of the duty cycle signal, a high level has a time length of Di*T, and a rising edge of the high level of the duty cycle signal is synchronized with a rising edge of a high level of the clock signal, the time length of the high level of the duty cycle signal is an integral multiple of the clock cycle, wherein Di represents the duty cycle corresponding to an ith charge and discharge circuit, T represents a time length of the integration cycle.

Preferably, the adding circuit for multi-channel signals also includes a first filter capacitor, a second filter capacitor and a third filter capacitor, wherein the first filter capacitor is connected between the first input terminal and the second input terminal of the operational amplifier, the second filter capacitor is connected between the second input terminal and the output terminal of the operational amplifier, and the third filter capacitor is connected between the output terminal of the operational amplifier and the reference ground.

According to a second aspect, an implementation method of an adding circuit for multi-channel signals, which can be implemented based on the above adding circuit for multi-channel signals, is provided.

The implementation method of an adding circuit for multi-channel signals includes:

presetting a duty cycle for the plurality of charge and discharge circuits and the charge transfer circuit, by the control circuit;

calculate a number of the clock cycle in which the plurality of charge and discharge circuits and the charge transfer circuit are respectively in the working state during one integration cycle;

controlling an actual number of the clock cycle in which the plurality of charge and discharge circuits and the charge transfer circuit are respectively in the working state during one integration cycle to be equal to the calculated number via controlling a state of each switch in the switch sequence, wherein, the integration cycle is composed of a plurality of the clock cycles;

determining an adding result according to a voltage at the output terminal of the operational amplifier in at least one integration cycle.

The adding circuit for multi-channel signals and an implementation method of the adding circuit for multi-channel signals in this disclosure have the following beneficial effects. The duty cycle of each charge and discharge circuit and the charge transfer circuit can be programmed and preset according to the actual needs, which is not only suitable for the static voltage adding circuit, but also suitable for the dynamic voltage adding circuit. When there are multi-channel signals, the output interference caused by individual signals can be prevented. The area of the adding circuit can be greatly reduced. The adding circuit can be IP-based, controlled by programing and presetting a variety of combined adding algorithms, so the chip cost can be saved and a wide applicability in detection and monitoring can be provided.

BRIEF DESCRIPTION OF THE DRAWINGS

In order to explain embodiments of this disclosure or technical solutions in the prior art more clearly, the following will briefly introduce drawings required in the description for the embodiments or the prior art description. It is obvious that the drawings in the following description are only some embodiments of this disclosure. For those skilled in the art, other drawings can be obtained from these accompanying drawings without paying any creative works.

DESCRIPTION OF THE PREFERRED EMBODIMENTS

The technical solutions in example embodiments of the disclosure will be described clearly and completely below with reference to the accompanying drawings. Typical embodiments of this disclosure are given in the accompanying drawings. However, this disclosure can be implemented in many different forms and is not limited to the embodiments described herein. On the contrary, the purpose of providing these embodiments is to make the description of this disclosure more thorough and comprehensive. It should be understood that the embodiments of this disclosure and the specific features in the embodiments are a detailed description of the technical scheme of this disclosure, rather than a limitation of the technical scheme of this disclosure. Without conflict, the embodiments of this disclosure and the technical features in the embodiments can be combined with each other.

Unless otherwise defined, all technical and scientific terms used herein have the same meanings as those generally understood by those skilled in the technical field of this disclosure. The terms used in the description of this disclosure herein are only for the purpose of describing specific embodiments and are not intended to limit this disclosure.

The terms including ordinal numbers such as "first" and "second" used in this specification can be used to describe various constituent elements, but these constituent elements are not limited by these terms. The purpose of using these terms is only to distinguish one element from other one element. For example, without departing from the scope of this disclosure, the first constituent element may be named the second constituent element, and similarly, the second constituent element may also be named the first constituent element.

Embodiment One

Figure 1:
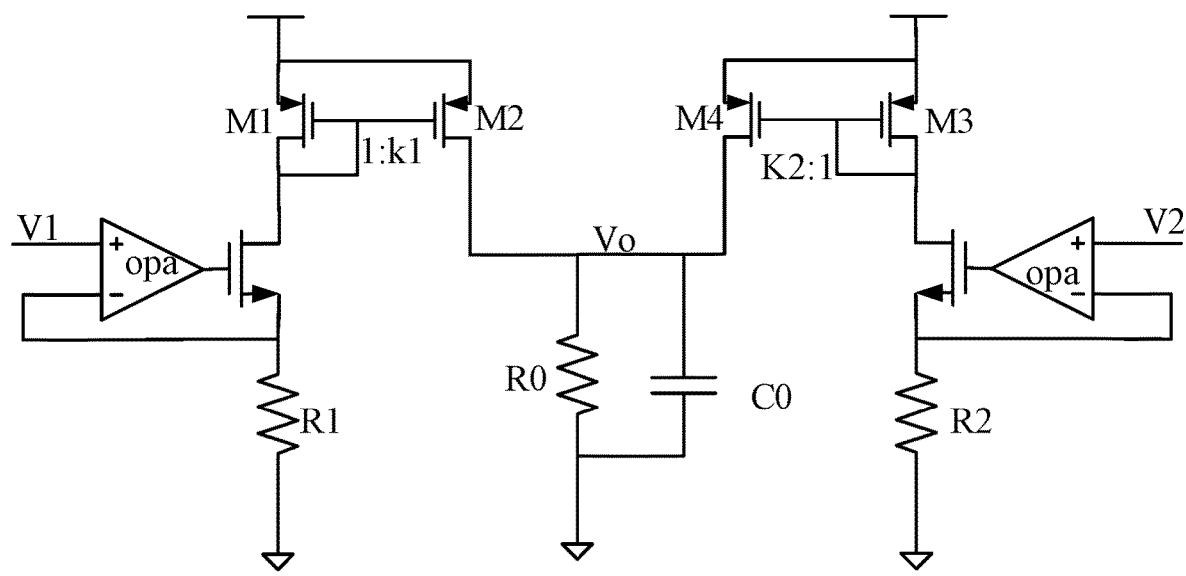
FIG. 1 is a circuit diagram of a known adding circuit for voltage signals.
Figure 2:
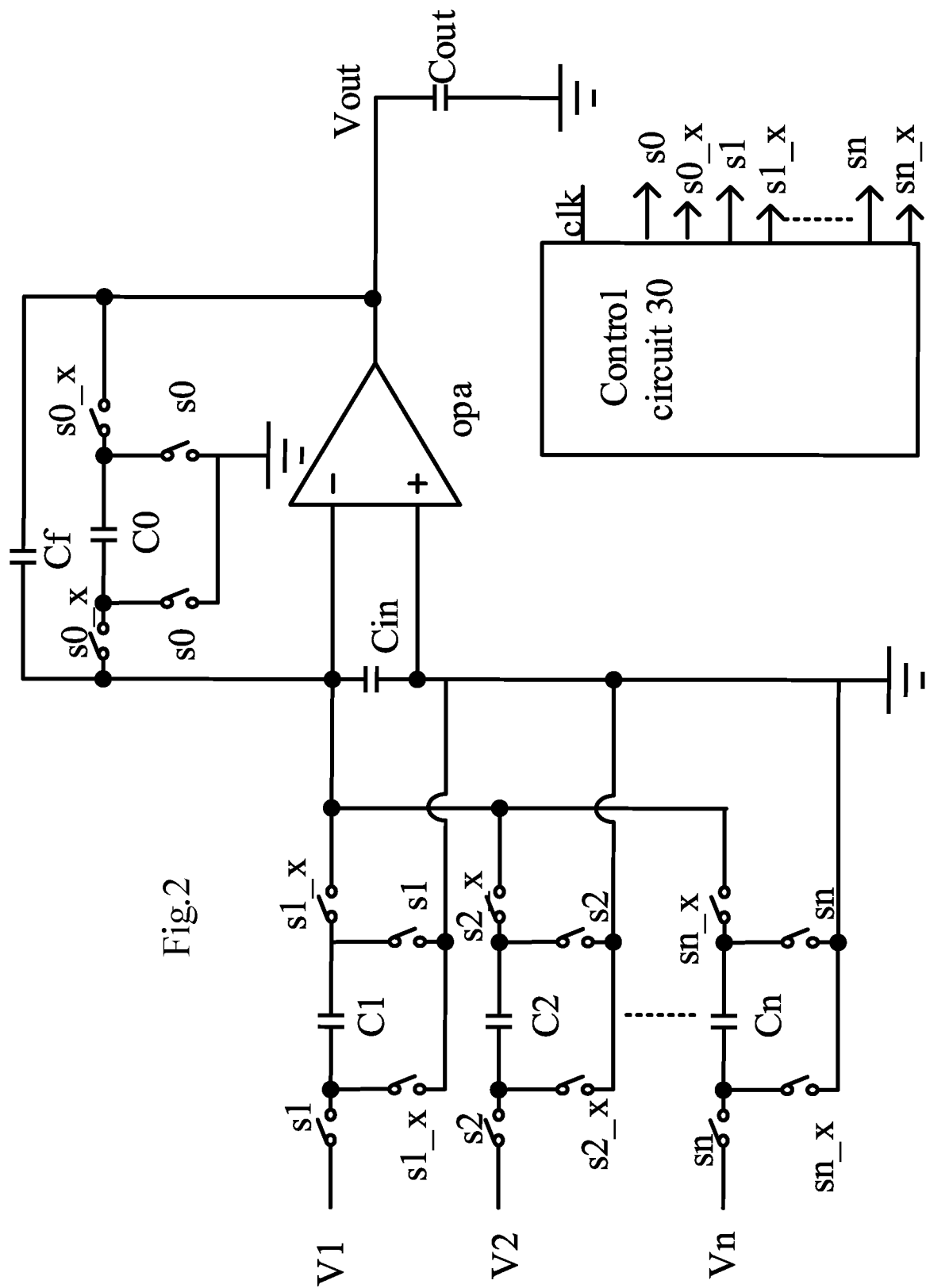
FIG. 2 is a circuit diagram of an adding circuit for multi-channel signals according to an embodiment of this disclosure.

Referring FIG. 2, this embodiment has disclosed an adding circuit for multi-channel signals, which including an operational amplifier opa, a plurality of charge and discharge circuits, a charge transfer circuit, a switch sequence, a control circuit 30, a first filter capacitor Cin, a second filter capacitor Cf and a third filter capacitor Cout. Specifically, each charge and discharge circuit includes at least one charge and discharge capacitor respectively, and the charge transfer circuit also includes at least one charge and discharge capacitor.

The operational amplifier opa is provided with a first input terminal and a second input terminal. The first input terminal and second input terminal have an equal voltage in a steady state, wherein the first input terminal is connected to a reference ground. The first filter capacitor Cin is connected between the first input terminal and the second input terminal of the operational amplifier opa, the second filter capacitor Cf is connected between the second input terminal and an output terminal of the operational amplifier opa, and the third filter capacitor is connected between the output terminal of the operational amplifier opa and the reference ground. It should be noted that the third filter capacitor Cout can be replaced by other filter circuits, such as a RC filter circuit, a switch capacitor filter circuit, etc.

The number of the plurality of charge and discharge circuits is consistent with the number of items to be added through the adding circuit for multi-channel signals. Each charge and discharge circuit is connected to a reference voltage. The charge and discharge circuit is connected between the reference ground and the second input terminal of the operational amplifier. The charge and discharge circuit is operable to be charged via the connected reference voltage and then discharge electrical charges in each clock cycle CLK when the charge and discharge circuit itself is in a working state. As shown in FIG. 2, in the present embodiment, there are n charge and discharge circuits, and each charge and discharge circuit includes one charge and discharge capacitor. That is, there are n charge and discharge capacitors C1 . . . Cn. For facilitating description, we use Ci to represent an equivalent value of a total capacitance in the ith charge and discharge circuit, $1 \le i \le n$, wherein n is a positive integer.

The charge transfer circuit is connected between the output terminal and the second input terminal of the operational amplifier opa. The charge transfer circuit is operable to discharge electrical charges and then be charged via the electrical charges discharged by all the charge and discharge circuits which are currently in the working state in each clock cycle CLK when the charge transfer circuit itself is in a working state. As shown in FIG. 2, in the present embodiment, the charge transfer circuit includes one charge and discharge capacitor Co. For facilitating description, we use Co to represent an equivalent value of a total capacitance in the charge transfer circuit.

The switch sequence includes a plurality of switches distributed in the plurality of charge and discharge circuits and the charge transfer circuit, and is operable to control a state of each of the plurality of charge and discharge circuits and a state of the charge transfer circuit to be or not to be the working state in each clock cycle by changing a switch state of the switch sequence.

The switch sequence includes a plurality of first switches S1-Sn, and a plurality of second switches s1_x-sn_x. Both terminals of each of the charge and discharge circuit and the charge transfer circuit are connected with two first switches and two second switches. The charge and discharge circuit is charged by switching on corresponding first switch and switching off corresponding second switch and discharged by switching on the corresponding second switch and switching off the corresponding first switch. The charge transfer circuit is discharged by switching on corresponding first switch and switching off corresponding second switch and charged by switching on the corresponding second switch and switching off the corresponding first switch.

Specifically, as shown in FIG. 2, the first terminal of each charge and discharge circuit (that is, the charge and discharge capacitor Ci) is connected to a corresponding reference voltage Vi, via one first switch si. The first terminal of each charge and discharge circuit Ci is further connected to the reference ground via one second switch si_x. The second terminal of each charge and discharge circuit Ci is connected to the reference ground via one first switch si. The second terminal of each charge and discharge circuit Ci is further connected to the second input terminal of the operational amplifier opa via one second switch si_x. The first terminal of the charge and discharge capacitor C0 is connected to the reference ground via one first switch s0. The first terminal of the charge and discharge capacitor C0 is further connected to the second input terminal of the operational amplifier opa via one second switch s0_x. The second terminal of the charge transfer circuit C0 is connected to the reference ground via one first switch s0. The second terminal of the charge transfer circuit C0 is further connected to the output terminal of the operational amplifier opa via one second switch s0_x.

The control circuit 30 is operable to calculate a number of the clock cycle CLK in which the plurality of charge and discharge circuits and the charge transfer circuit are respectively in the working state during one integration cycle T, based on the integration cycle T and a duty cycle respectively preset for the plurality of charge and discharge circuits and the charge transfer circuit; to control an actual number of the clock cycle CLK in which the plurality of charge and discharge circuits and the charge transfer circuit are respectively in the working state during one integration cycle T to be equal to the calculated number via controlling a state of each switch in the switch sequence; and to determine an adding result according to a voltage at the output terminal of the operational amplifier opa in at least one integration cycle T.

Figure 3:
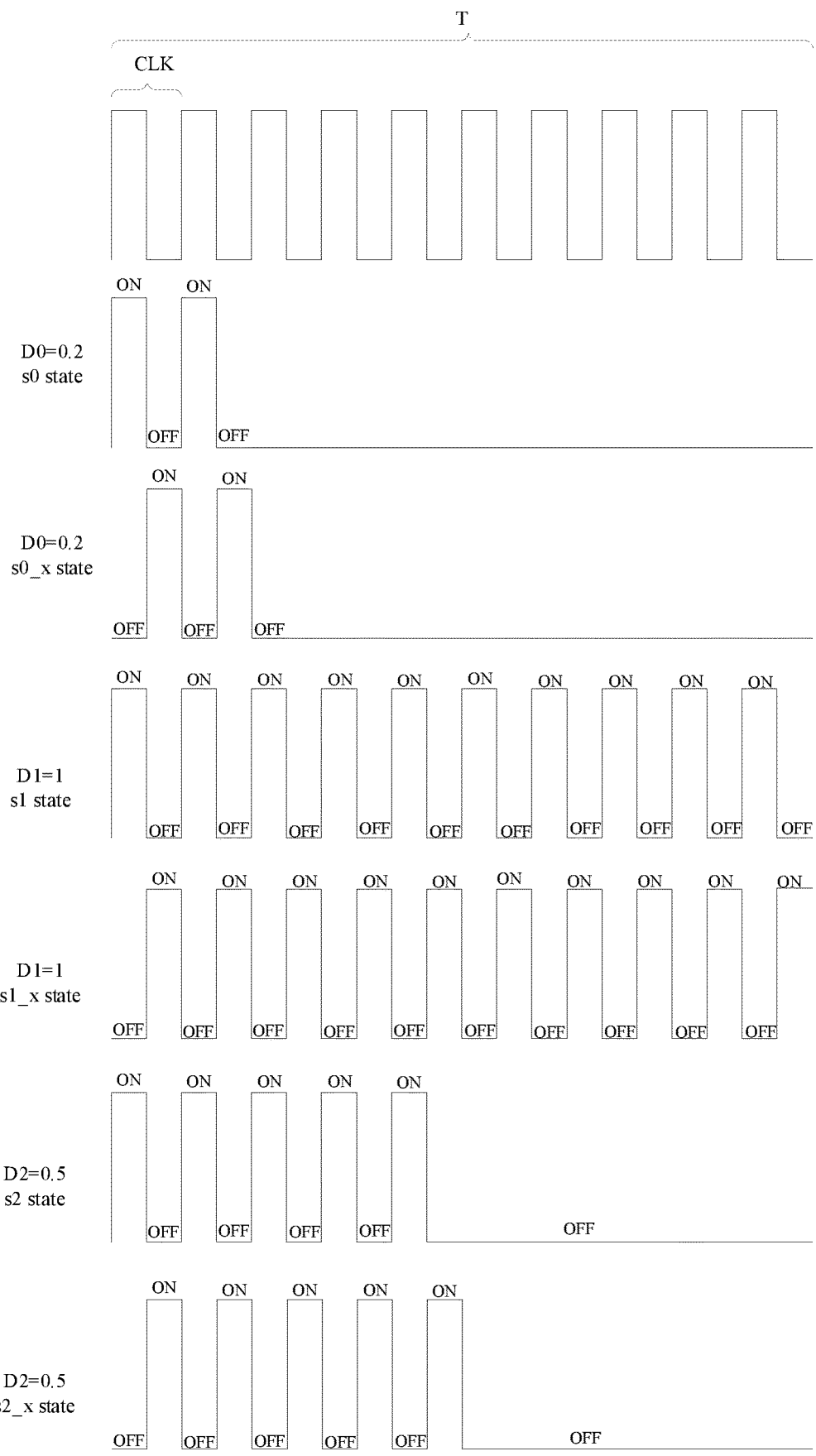
FIG. 3 is a waveform diagram showing the working principle of the adding circuit for multi-channel signals according to an embodiment of this disclosure.

Referring FIG. 3, the integration cycle T is composed of in clock cycles CLK. It should be noted that, FIG. 3 takes the value of m as 10 just for simple illustration and easy understanding. In fact, the integration cycle T is far larger than the clock cycle CLK, that is, in is a relatively large, such as 100.

Specifically, assuming that the duty cycle of the charge and discharge circuit is Di, the number of the clock cycle CLK in which the plurality of charge and discharge circuits and the charge transfer circuit are respectively in the working state during one integration cycle T, is calculated according to the calculation formula of Di*m. For example, if M=100, that is, one integration cycle T has 100 clock cycles CLK. If Di=0.5, it means that the number of the clock cycle CLK in which the ith charge and discharge circuit is in the working state is 100*0.5=50.

Furthermore, in each clock cycle CLK, a switching time for charge and discharge of the charge and discharge circuit in the working state, and a switching time for charge and discharge of the charge transfer circuit in the working state, are all kept synchronized. That is, in each clock cycle CLK, the first switch of the charge and discharge circuit in the working state and the first switch of the charge transfer circuit in the working state are switched on or off synchronously, and the second switch of the charge and discharge circuit in the working state and the second switch of the charge transfer circuit in the working state are switched off or on synchronously. It can be understood that, if the charge and discharge circuit and the charge transfer circuit are not in the working state during the in the current clock cycle CLK, the corresponding first switch and the corresponding second switch are both switched off.

Figure 4:
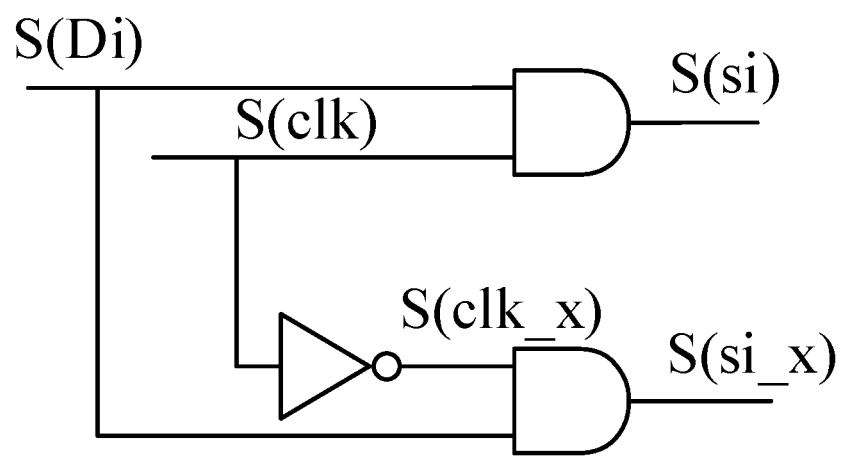
FIG. 4 is a schematic diagram showing a generation logic of control signals of a first switch and a second switch.
Figure 5:
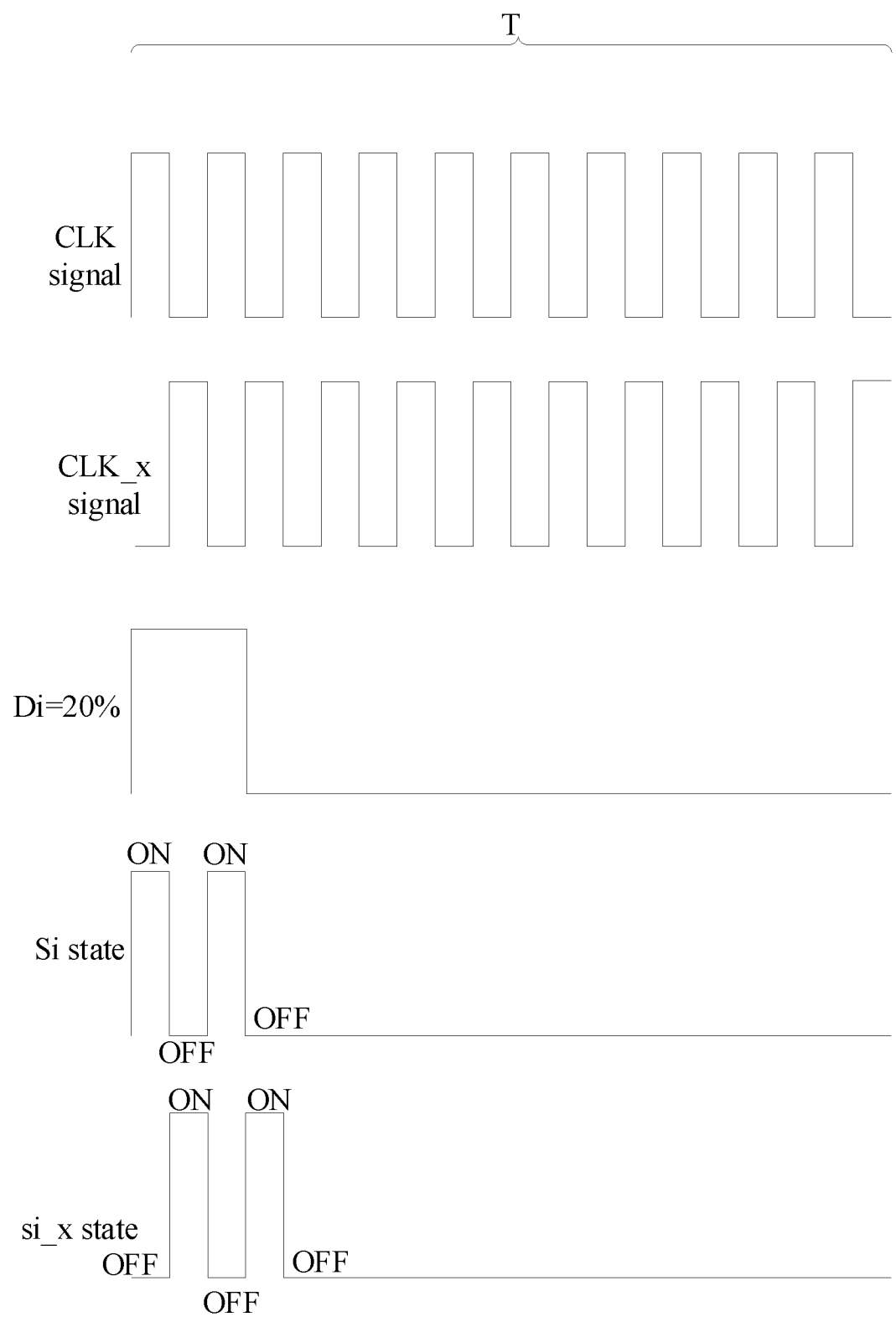
FIG. 5 is a waveform diagram showing a generation process of control signals of a first switch and a second switch.

Referring FIGS. 4-5, the generation scheme for a first control signal S(si) of the first switch si and a second control signal S(si_x) of the second switch si_x are introduced by taking the first switch si and second switch si_x corresponding to the ith charge and discharge circuit for example. Both of the first switch si and second switch si_x are switched on by a high level and switched off by a low level. The first control signal S(si) of the first switch si is obtained by combining a clock signal S(CLK) and a duty cycle signal S(Di) corresponding to the preset duty cycle. The second control signal S(si_x) of the second switch si_x is obtained by combining an inverse signal S(CLK_x) of the clock signal S(CLK) and the duty cycle signal S(Di) corresponding to the preset duty cycle. Of course, the signal S(CLK_x) and the clock signal S(CLK) can also be non-overlapping clock signals.

Wherein, the duty cycle signal S(Di) has a signal cycle which is consistent with the integration cycle T. That is, the signal cycle of the duty cycle signal S(Di) is also T. In one signal cycle of the duty cycle signal, a high level has a time length of Di*T, and a rising edge of the high level of the duty cycle signal is synchronized with a rising edge of a high level of the clock signal, the time length of the high level of the duty cycle signal is an integral multiple of the clock cycle CLK.

Specifically, the adding result determined according to a voltage at the output terminal of the operational amplifier opa in at least one integration cycle T, is calculated as follows:

$$\Sigma_{i=1}^{n} Di*Vi*Ci = D0*C0*V\text{out};$$

wherein, n represents a number of the charge and discharge circuits, Di represents a duty cycle corresponding to an ith charge and discharge circuit, $0 \leq Di \leq 1$, Vi represents a voltage value of the connected reference voltage of the ith charge and discharge circuit. Vi=0 represents that the reference voltage is disconnected and does not participate in the adding circuit, and the switches (that is, the first and second switches) of the corresponding charge and discharge circuit are switched off. Ci represents a capacitance of the charge and discharge capacitor of the ith charge and discharge circuit, D0 represents a duty cycle corresponding to the charge transfer circuit, C0 represents a capacitance of the charge and discharge capacitor of the charge transfer circuit, Vout represents an average value of the voltage at the output terminal of the operational amplifier opa in at least one integration cycle T.

The working principle of this embodiment is described below.

Take the ith charge and discharge circuit as an example, wherein $1 \leq i \leq n$. The first switch si is switched on while the second switch six is switched off, the capacitor Ci is charged from 0V to Vi, and the capacitor C0 is discharged from Vout to 0V. When the first switch si is switched off while the second switch si_x is switched on, the electrical charges on the capacitor Ci which is Vi*Ci, is transferred to the capacitor C0 and capacitor Cf. When achieving the balance state, in one integration cycle T, the average charge of capacitor Ci is Di*Vi*Ci, which is equal to the discharged charge of capacitor C0: D0*Vout*C0.

That is, D1*V1*C1+D2*V2*C2+ . . . +Dn*Vn*Cn=D0*Vout*C0.

Referring FIG. 3, it is assumed that one integration cycle T includes 10 clock cycles CLK, that is T=10*CLK. Generally, one integration cycle T includes more than 10 clock cycles CLK. Herein, 10 clock cycles CLK are just chosen for the convenience of drawing and understanding. If D0=0.2, it means that in the 10 clock cycles CLK of one integration cycle T, the capacitor C0 is in the working state in two clock cycles CLK. For example, in the earlier two clock cycles CLK, the capacitor C0 is charged and discharged in each clock cycle for once. That is, the control circuit controls the first switch s0 to be switched on and the second switch s0_x to be switched off, and then controls the first switch s0 to be switched off and the second switch s0_x to be switched on. However, in the later eight clock cycles CLK, the first switch s0 and the second switch s0_x are always switched off. If D1=1, it means that in the 10 clock cycles CLK of one integration cycle T, the capacitor C1 is in the working state. That is, in each clock cycle CLK, the capacitor C0 is charged and discharged for once. Accordingly, the first switch s1 is switched on and the second switch s1_x is switched off at first, and then the first switch s1 is switched off and the second switch s1_x is switched on. If D2=0.5, it means that in the 10 clock cycles CLK of one integration cycle T, the capacitor C2 is in the working state in 5 clock cycles CLK. For example, in the earlier 5 clock cycles CLK, the capacitor C2 is charged and discharged in each clock cycle for once. Accordingly, the first switch s2 is switched on and the second switch s2_x is switched off at first, and then the first switch s2 is switched off and the second switch s2_x is switched on. However, in the later 5 clock cycles CLK, the first switch s1 and the second switch s1_x are always switched off.

In one integration cycle T, when reaching the steady state, due to the conservation of electrical charge, the total charged electrical charges is equal to the total discharged electrical charges, that is, 10*V1*C1+5*V2*C2=2*Vout*C0. Accordingly, we can estimate the final adding result by measuring Vout and then calculate 2*Vout*C0.

As the duty cycle Di can be controlled by programming, so the adding items can be changed according to the actual needs, which is not only suitable for the static voltage adding circuit, but also suitable for the dynamic voltage adding circuit. When there are multi-channel signals, the output interference caused by individual signals can be prevented. The area of the adding circuit can be greatly reduced. The adding circuit can be IP-based, controlled by programing and presetting a variety of combined adding algorithms, so the chip cost can be saved and a wide applicability in detection and monitoring can be provided.

Embodiment Two

Based on the same technical concept, this embodiment has provided an implementation method of an adding circuit for multi-channel signals, which can be implemented based on the above adding circuit for multi-channel signals disclosed in embodiment one.

The implementation method of an adding circuit for multi-channel signals includes following steps.

In step S101, the control circuit presets a duty cycle for the plurality of charge and discharge circuits and the charge transfer circuit. That is, the specific value of the duty cycle Di is preset by programming, wherein 0≤Di≤1.

In step S102, a number of the clock cycle CLK in which the plurality of charge and discharge circuits and the charge transfer circuit are respectively in the working state during one integration cycle T, is calculated. Specifically, the number of the clock cycle CLK in which the charge and discharge circuit and the charge transfer circuit are respectively in the working state is Di*m.

In step S103, an actual number of the clock cycle CLK in which the plurality of charge and discharge circuits and the charge transfer circuit are respectively in the working state during one integration cycle T is controlled to be equal to the calculated number via controlling a state of each switch in the switch sequence.

In step S104, an adding result is determined according to a voltage at the output terminal of the operational amplifier opa in at least one integration cycle T.

For more details, please refer to a part of the embodiment, which will not be repeated here.

In addition, as understood by those skilled in the art, the principles herein may be reflected in a computer program product on a computer-readable storage medium that is pre-installed with computer-readable program codes. Any tangible, non-transitory computer-readable storage medium can be used, including magnetic storage devices (hard disks, floppy disks, etc.), optical storage devices (CD-ROM, DVD, Blu Ray disks, etc.), flash memory, and/or the like. These computer program instructions can be loaded onto a general-purpose computer, a dedicated computer, or other programmable data processing device to form a machine, so that these instructions executed on a computer or other programmable data processing apparatus can generate an apparatus that implements a specified function. These computer program instructions can also be stored in a computer-readable memory that can instruct a computer or other programmable data processing device to operate in a specific manner, so that the instructions stored in the computer-readable memory can form a manufactured product, including an implementation apparatus that implements a specified function. The computer program instructions can also be loaded onto a computer or other programmable data processing device, so that a series of operating steps are performed on the computer or other programmable device to produce a computer-implemented process, so that the instructions executed on a computer or other programmable data processing device can provide steps for implementing specified functions.

The foregoing specific description has been described with reference to various embodiments. However, those skilled in the art will recognize that various modifications and changes can be made without departing from the scope of the present disclosure. Therefore, consideration of the present disclosure will be in an illustrative rather than a restrictive sense, and all such modifications will be included within the scope thereof. Also, the advantages of various embodiments, other advantages, and the solutions to problems have been described above. However, the benefits, advantages, solutions to problems, and any elements that can produce these, or solutions that make them more explicit, should not be interpreted as critical, necessary, or essential. The term "comprising", and any other variants thereof used herein are non-exclusive, so that the process, method, document, or device that includes a list of elements includes not only these elements, but also other elements that are not explicitly listed or do not belong to the process, method, system, document, or device. Furthermore, the term "coupling" and any other variations thereof used herein refer to physical connection, electrical connection, magnetic connection, optical connection, communication connection, functional connection, and/or any other connection.

The above-mentioned examples merely represent several embodiments, giving specifics and details thereof, but should not be understood as limiting the scope of patent of this disclosure thereby. It should be noted that a person of ordinary skill in the art could also make several variations and improvements without departing from the concept of this disclosure, and these variations and improvements would all fall within the scope of protection of this disclosure. Therefore, the scope of protection of patent of this disclosure should be in accordance with the appended claims.

What is claimed is:

1. An adding circuit for multi-channel signals, comprising:
    an operational amplifier, which is provided with a first input terminal and a second input terminal having an equal voltage in a steady state, wherein the first input terminal is connected to a reference ground;
    a plurality of charge and discharge circuits, which are connected between the reference ground and the second input terminal of the operational amplifier, wherein the charge and discharge circuit is operable to be charged via a connected reference voltage and then discharge electrical charges in each clock cycle when the charge and discharge circuit itself is in a working state;
    a charge transfer circuit, which is connected between an output terminal and the second input terminal of the operational amplifier and operable to discharge electrical charges and then be charged via the electrical charges discharged by all the charge and discharge circuits which are currently in the working state in each clock cycle when the charge transfer circuit itself is in a working state;
    a switch sequence, which includes a plurality of switches distributed in the plurality of charge and discharge circuits and the charge transfer circuit, and is operable to control a state of each of the plurality of charge and discharge circuits and a state of the charge transfer circuit to be or not to be the working state in each clock cycle by changing a switch state of the switch sequence;

a control circuit, which is operable to calculate a number of the clock cycle in which the plurality of charge and discharge circuits and the charge transfer circuit are respectively in the working state during one integration cycle, based on the integration cycle and a duty cycle respectively preset for the plurality of charge and discharge circuits and the charge transfer circuit; to control an actual number of the clock cycle in which the plurality of charge and discharge circuits and the charge transfer circuit are respectively in the working state during one integration cycle to be equal to the calculated number via controlling a state of each switch in the switch sequence; and to determine an adding result according to a voltage at the output terminal of the operational amplifier in at least one integration cycle, wherein, the integration cycle is composed of a plurality of the clock cycles;

wherein each of the charge and discharge circuit and the charge transfer circuit includes at least one charge and discharge capacitor respectively.

2. The adding circuit for multi-channel signals according to claim 1, wherein the adding result determined according to a voltage at the output terminal of the operational amplifier in at least one integration cycle, is calculated as follows:

$$\Sigma_{i=1}^{n} Di*Vi*Ci = D0*C0*Vout;$$

wherein, n represents a number of the charge and discharge circuits, Di represents a duty cycle corresponding to an ith charge and discharge circuit, $0 \leq Di \leq 1$, Vi represents a voltage value of the connected reference voltage of the ith charge and discharge circuit, Ci represents a capacitance of the charge and discharge capacitor of the ith charge and discharge circuit, D0 represents a duty cycle corresponding to the charge transfer circuit, C0 represents a capacitance of the charge and discharge capacitor of the charge transfer circuit, Vout represents an average value of the voltage at the output terminal of the operational amplifier in at least one integration cycle.

3. The adding circuit for multi-channel signals according to claim 1, wherein in each clock cycle, a switching time for charge and discharge of the charge and discharge circuit in the working state, and a switching time for charge and discharge of the charge transfer circuit in the working state, are all kept synchronized.

4. The adding circuit for multi-channel signals according to claim 1, wherein the switch sequence includes a plurality of first switches and a plurality of second switches, and both terminals of each of the charge and discharge circuit and the charge transfer circuit are connected with two first switches and two second switches;

wherein the charge and discharge circuit is charged by switching on corresponding first switch and switching off corresponding second switch, and discharged by switching on the corresponding second switch and switching off the corresponding first switch;

the charge transfer circuit is discharged by switching on corresponding first switch and switching off corresponding second switch, and charged by switching on the corresponding second switch and switching off the corresponding first switch;

when the charge and discharge circuit and the charge transfer circuit are not in the working state, the corresponding first switch and the corresponding second switch are both switched off.

5. The adding circuit for multi-channel signals according to claim 4, wherein a first terminal of each charge and discharge circuit is connected to a corresponding reference voltage via one first switch and is further connected to the reference ground via one second switch, wherein a second terminal of each charge and discharge circuit is connected to the reference ground via one first switch and is further connected to the second input terminal of the operational amplifier via one second switch.

6. The adding circuit for multi-channel signals according to claim 5, wherein a first terminal of the charge transfer circuit is connected to the reference ground via one first switch and is further connected to the second input terminal of the operational amplifier via one second switch, wherein a second terminal of the charge transfer circuit is connected to the reference ground via one first switch and is further connected to the output terminal of the operational amplifier via one second switch.

7. The adding circuit for multi-channel signals according to claim 4, wherein both the first switch and the second switch are switched on by a high level, and switched off by a low level, wherein a control signal of the first switch is obtained by combining a clock signal and a duty cycle signal corresponding to a preset duty cycle, and a control signal of the second switch is obtained by combining an inverse signal of the clock signal and the duty cycle signal;

wherein, the duty cycle signal has a signal cycle which is consistent with the integration cycle, wherein in one signal cycle of the duty cycle signal, a high level has a time length of Di*T, and a rising edge of the high level of the duty cycle signal is synchronized with a rising edge of a high level of the clock signal, the time length of the high level of the duty cycle signal is an integral multiple of the clock cycle, wherein Di represents the duty cycle corresponding to an ith charge and discharge circuit, T represents a time length of the integration cycle.

8. The adding circuit for multi-channel signals according to claim 1, wherein the adding circuit for multi-channel signals also includes a first filter capacitor, a second filter capacitor and a third filter capacitor, wherein the first filter capacitor is connected between the first input terminal and the second input terminal of the operational amplifier, the second filter capacitor is connected between the second input terminal and the output terminal of the operational amplifier, and the third filter capacitor is connected between the output terminal of the operational amplifier and the reference ground.

9. An implementation method of an adding circuit for multi-channel signals comprising an operational amplifier, a plurality of charge and discharge circuits, a charge transfer circuit, a switch sequence and a control circuit, wherein the implementation method comprises:

presetting a duty cycle for the plurality of charge and discharge circuits and the charge transfer circuit, by the control circuit;

calculate a number of a clock cycle in which the plurality of charge and discharge circuits and the charge transfer circuit are respectively in a working state during one integration cycle;

controlling an actual number of the clock cycle in which the plurality of charge and discharge circuits and the charge transfer circuit are respectively in the working state during one integration cycle to be equal to the calculated number via controlling a state of each switch in the switch sequence, wherein, the integration cycle is composed of a plurality of the clock cycles;

determining an adding result according to a voltage at an output terminal of the operational amplifier in at least one integration cycle;

wherein the operational amplifier is provided with a first input terminal and a second input terminal having an equal voltage in a steady state, wherein the first input terminal is connected to a reference ground;

the plurality of charge and discharge circuits are connected between the reference ground and the second input terminal of the operational amplifier, wherein the charge and discharge circuit is operable to be charged via a connected reference voltage and then discharge electrical charges in each clock cycle when the charge and discharge circuit itself is in the working state;

the charge transfer circuit, which is connected between an output terminal and the second input terminal of the operational amplifier, is operable to discharge electrical charges and then be charged via the electrical charges discharged by all the charge and discharge circuits which are currently in the working state in each clock cycle when the charge transfer circuit itself is in the working state;

the switch sequence, which includes a plurality of switches distributed in the plurality of charge and discharge circuits and the charge transfer circuit, is operable to control the state of each of the plurality of charge and discharge circuits and a state of the charge transfer circuit to be or not to be the working state in each clock cycle by changing a switch state of the switch sequence.

10. The implementation method of an adding circuit for multi-channel signals according to claim 9, wherein each of the charge and discharge circuit and the charge transfer circuit includes at least one charge and discharge capacitor respectively.

11. The implementation method of an adding circuit for multi-channel signals according to claim 10, wherein determining an adding result according to a voltage at an output terminal of the operational amplifier in at least one integration cycle comprises calculating the adding result according to following equation:

$$\Sigma_{i=1}^{n} Di*Vi*Ci = D0*C0*Vout;$$

wherein, n represents a number of the charge and discharge circuits, Di represents a duty cycle corresponding to an ith charge and discharge circuit, $0 \leq Di \leq 1$, Vi represents a voltage value of the connected reference voltage of the ith charge and discharge circuit, Ci represents a capacitance of the charge and discharge capacitor of the ith charge and discharge circuit, D0 represents a duty cycle corresponding to the charge transfer circuit, C0 represents a capacitance of the charge and discharge capacitor of the charge transfer circuit, Vout represents an average value of the voltage at the output terminal of the operational amplifier in at least one integration cycle.

12. The implementation method of an adding circuit for multi-channel signals according to claim 9, wherein in each clock cycle, a switching time for charge and discharge of the charge and discharge circuit in the working state, and a switching time for charge and discharge of the charge transfer circuit in the working state, are all kept synchronized.

13. The implementation method of an adding circuit for multi-channel signals according to claim 6, wherein the switch sequence includes a plurality of first switches and a plurality of second switches, and both terminals of each of the charge and discharge circuit and the charge transfer circuit are connected with two first switches and two second switches;

wherein the charge and discharge circuit is charged by switching on corresponding first switch and switching off corresponding second switch, and discharged by switching on the corresponding second switch and switching off the corresponding first switch;

the charge transfer circuit is discharged by switching on corresponding first switch and switching off corresponding second switch, and charged by switching on the corresponding second switch and switching off the corresponding first switch;

when the charge and discharge circuit and the charge transfer circuit are not in the working state, the corresponding first switch and the corresponding second switch are both switched off.

14. The implementation method of an adding circuit for multi-channel signals according to claim 13, wherein a first terminal of each charge and discharge circuit is connected to a corresponding reference voltage via one first switch and is further connected to the reference ground via one second switch, wherein a second terminal of each charge and discharge circuit is connected to the reference ground via one first switch and is further connected to the second input terminal of the operational amplifier via one second switch.

15. The implementation method of an adding circuit for multi-channel signals according to claim 14, wherein a first terminal of the charge transfer circuit is connected to the reference ground via one first switch and is further connected to the second input terminal of the operational amplifier via one second switch, wherein a second terminal of the charge transfer circuit is connected to the reference ground via one first switch and is further connected to the output terminal of the operational amplifier via one second switch.

16. The implementation method of an adding circuit for multi-channel signals according to claim 14, wherein both the first switch and the second switch are switched on by a high level, and switched off by a low level, wherein a control signal of the first switch is obtained by combining a clock signal and a duty cycle signal corresponding to a preset duty cycle, and a control signal of the second switch is obtained by combining an inverse signal of the clock signal and the duty cycle signal;

wherein, the duty cycle signal has a signal cycle which is consistent with the integration cycle, wherein in one signal cycle of the duty cycle signal, a high level has a time length of Di*T, and a rising edge of the high level of the duty cycle signal is synchronized with a rising edge of a high level of the clock signal, the time length of the high level of the duty cycle signal is an integral multiple of the clock cycle, wherein Di represents the duty cycle corresponding to an ith charge and discharge circuit, T represents a time length of the integration cycle.

17. The implementation method of an adding circuit for multi- channel signals according to claim 9, wherein the adding circuit for multi-channel signals also includes a first filter capacitor, a second filter capacitor and a third filter capacitor, wherein the first filter capacitor is connected between the first input terminal and the second input terminal of the operational amplifier, the second filter capacitor is connected between the second input terminal and the output terminal of the operational amplifier, and the third filter capacitor is connected between the output terminal of the operational amplifier and the reference ground.

* * * * *